United States Patent [19]

Estrabaud et al.

[11] 4,258,622
[45] Mar. 31, 1981

[54] METHOD OF POSITIONING A MOVING PART AND A PRINTER OPERATING IN ACCORDANCE WITH SAID METHOD

[75] Inventors: Stephane Estrabaud, Orsay; Gerard Nourigat, St. Remy les Chevreuses, both of France

[73] Assignee: Compagnie Generale d'Automatisme, Paris, France

[21] Appl. No.: 95,267

[22] Filed: Nov. 19, 1979

[30] Foreign Application Priority Data

Nov. 17, 1978 [FR] France ................................ 78 32501

[51] Int. Cl.³ ............................. B41J 1/22; B41J 9/00
[52] U.S. Cl. .............................. 101/93.01; 400/154.5; 101/93.19; 318/685; 318/603; 318/696
[58] Field of Search ............ 400/154.5; 310/36, 40 R, 310/46, 49 R; 318/696, 282, 286, 685, 601, 603; 101/93.01, 93.19

[56] References Cited

U.S. PATENT DOCUMENTS

| | | | |
|---|---|---|---|
| 3,573,589 | 4/1971 | Berry | 318/685 X |
| 3,586,953 | 6/1971 | Markkanen et al. | 318/685 |
| 3,588,661 | 6/1971 | Newell | 318/696 |
| 3,864,615 | 2/1975 | Williams | 318/685 |
| 4,025,837 | 5/1977 | Meier et al. | 318/685 |
| 4,074,179 | 2/1978 | Kuo | 318/696 |
| 4,115,726 | 9/1978 | Patterson et al. | 318/696 X |
| 4,131,840 | 12/1978 | Wiesner | 318/685 |
| 4,142,140 | 2/1979 | Wiesner | 318/696 |
| 4,145,643 | 3/1979 | Maeda et al. | 318/696 |
| 4,215,302 | 7/1980 | Chiang | 318/696 |

FOREIGN PATENT DOCUMENTS

| | | | |
|---|---|---|---|
| 2042903 | 3/1972 | Fed. Rep. of Germany | 400/154.5 |
| 2721271 | 11/1978 | Fed. Rep. of Germany | 400/154.5 |
| 2018684 | 10/1979 | United Kingdom | 400/154.5 |

OTHER PUBLICATIONS

"Delayed Closed-Loop Scheme for Stepping Motor Control" Bechtle, IBM Journal of Research & Development, vol. 20, No. 3, pp. 235–243, May 1976.

*Primary Examiner*—E. H. Eickholt
*Attorney, Agent, or Firm*—Sughrue, Rothwell, Mion, Zinn and Macpeak

[57] ABSTRACT

The invention comes within the field of equipment control. A method of shifting a moving unit from a first position to a second position by means of a stepping motor driven by a finite sequence of pulses, said moving unit being liable to oscillate about its equilibrium point, characterized in that as a function of the period and of the damping factor of the oscillation, the time intervals which separate said pulses are chosen so that the last pulse is applied to the motor at an instant when the oscillation resulting from the set of preceding pulses brings the moving unit substantially to the required final position and reduces its speed substantially to zero. It applies in particular to disc-type printers.

6 Claims, 3 Drawing Figures

METHOD OF POSITIONING A MOVING PART AND A PRINTER OPERATING IN ACCORDANCE WITH SAID METHOD

FIELD OF THE INVENTION

The invention relates to a method of shifting a moving unit controlled by a stepping motor when, in an interval between two steps the moving unit is liable to oscillate about an equilibrium position.

The invention also relates to a disc-type printer which operates in accordance with the method of the invention.

BACKGROUND OF THE INVENTION

The invention will be described with reference to the example of a rotary movement such as that of a printer disc, but it is applicable to all stepping movements in which the moving unit is liable to describe oscillations which can be substantially represented by a second-order system which is not critically damped.

If said time intervals between successive steps are not suitably chosen, the oscillating movement which follows the last pulse (and which may be due e.g. to the inertia of the moving unit and to the elasticity of the mechanical transmission parts) may continue for a relatively long time during which the position of the moving unit varies continually about the required position without stopping there. It is known to mitigate this disadvantage by means of a damping device; however, to be effective, this damping device must be able to damp appreciable energy; this increases its weight its bulk and its cost and subjects the motor to extra stresses.

German published patent application no. 2 042 903 describes an attempt to obtain this result by a particular method of defining the time interval between the last two pulses. However, it is clear that if the teaching of the application is followed, the desired result is not obtained, since it requires both the rotor inertia to be matched to a specific value and the total number of pulses to be sufficiently large with respect to the damping coefficient for the moving unit to have achieved steady state motion before the last pulse but one is applied thereto. These requirements are not specifically stated in the said specification, but they follow from the analysis of the problem.

The present invention provides a method of shifting a moving unit from a first position to a second position by means of a stepping motor driven by a finite sequence of pulses, said moving unit being liable to oscillate about its equilibrium point, the time intervals which separate said pulses being chosen as a function of the period and of the damping factor of the oscillation so that the last pulse is applied to the motor at an instant when the oscillation resulting from the set of preceding pulses brings the moving unit substantially to the required final position and reduces its speed substantially to zero, and wherein the last pulse but one of the sequence of pulses is applied to the motor at an instant when the point which represents the shift of the moving unit caused by said pulse and as shown in the phase-plane chart at a point centred on the equilibrium point resulting from said pulse is substantially located on the spiral which passes through the zero speed point and through the point of the x-axis equal to the amplitude of the last step.

Preferably the pulses other than the last and the first are applied at instants when the point which represents the shift of the moving unit, said shift being caused by each pulse and shown in the chart on the equilibrium point resulting from said pulse, is substantially located on said spiral.

The invention further provides a disc-type printer which includes a rotating disc which bears a set of characters and which can be driven by a stepping motor to place the required character in the required printing position, said disc being liable to oscillate about its equilibrium position; means for positioning the paper and making it advance; means for pressing the paper against the disc when said disc is substantially motionless; means which supply the motor with pulses; and means for triggering pulses at defined intervals; characterized in that the last pulse but one is applied to the motor in such a manner that the point on the phase plane chart representative of the motion of the moving parts after said last pulse but one, and with respect to the equilibrium position of the parts at that moment is situated on the spiral which passes through the zero speed point on the x-axis at a displacement corresponding to the last pulse and wherein the last pulse is applied to the motor substantially at the moment when the moving parts are in the desired final position.

The invention will be better understood from the description of an embodiment given hereinafter with reference to the accompanying drawing.

DESCRIPTION OF THE PREFERRED EMBODIMENTS

Figure 1:
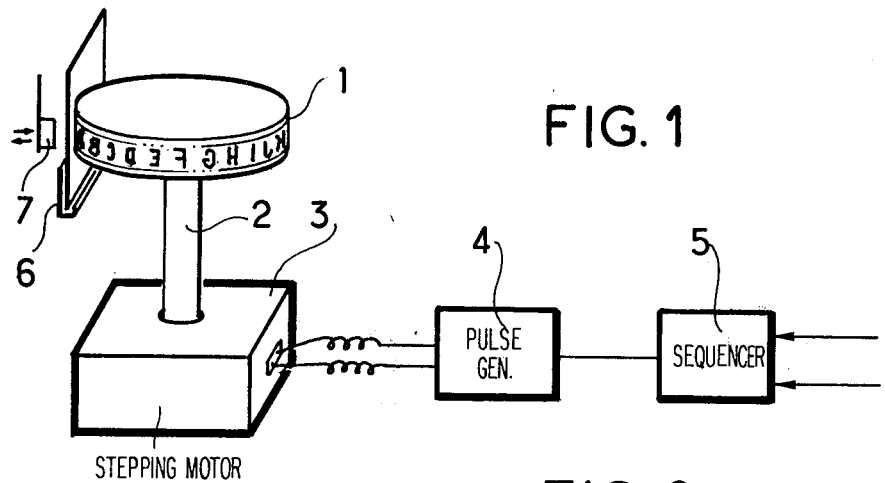
FIG. 1 illustrates schematically a disc-type printer as an example of an application of the method in accordance with the invention.

With reference to FIG. 1, a printer includes a printing disc 1 which bears a set of characters in relief. It is installed on a shaft 2 driven by a stepping motor 3 which is driven by a pulse generator 4. Each pulse from the pulse generator makes the printing disc rotate through an angle equal to the gap between two successive characters or to an integer fraction thereof. The pulse generator 4 is dependent on a sequencer 5 which determines the instant when each pulse is to be applied to the motor. Since it is necessary for the sequencer to be informed of the number of steps which separate the initial state from the required final state, it advantageously includes a clock oscillator whose frequency is higher than the resonant frequencies of the moving unit, together with a programmed divider which supplies pulses at successive time intervals obtained by dividing the clock frequency. The sequencer also receives a starting instruction which triggers the first pulse.

The printer also includes an inking ribbon, not shown in the figure, and paper feed and support means 6 as well as a hammer 7 which strikes the paper against the character when the disc stops in the required position.

The disc 1 and the shaft 2 constitute a very lightly damped mass and spring system whose oscillation, in the prior art, makes it essential to delay actuating the hammer after the last positioning pulse until the movement is damped, so as to avoid hammer contact to either side of the character and to prevent the character from sliding during printing. This greatly slows down the printing speed. In contrast, in accordance with the invention, when the disc is in the neighbourhood of the required position and just before the last pulse it is already rotating at low speed, so said last pulse aims only to cancel the residual elastic potential energy. Since the kinetic energy itself is low, the amplitude of the final oscillation is negligible and printing can take place at once.

Figure 2:
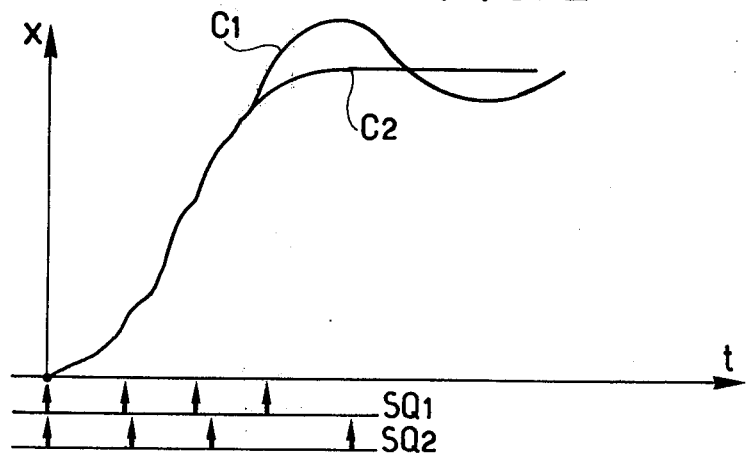
FIG. 2 is a graph of the oscillations x of the disc as a function of time for two distinct series of four pulses one of which corresponds to the method in accordance with the invention.

FIG. 2 is a graph of the rotational movement x of the disc as a function of time t during two sequences of four pulses. The first of these sequences (SQ1) is constituted by equal intervals, while the second (SQ2) has irregular intervals. The corresponding curves C1 and C2 show that the disc can be stabilized much more rapidly when, as in sequence SQ2, the intervals are in accordance with the invention, so that the last pulse is generated at the instant when the moving unit is close to its required final position and is moving at a speed close to zero.

Figure 3:
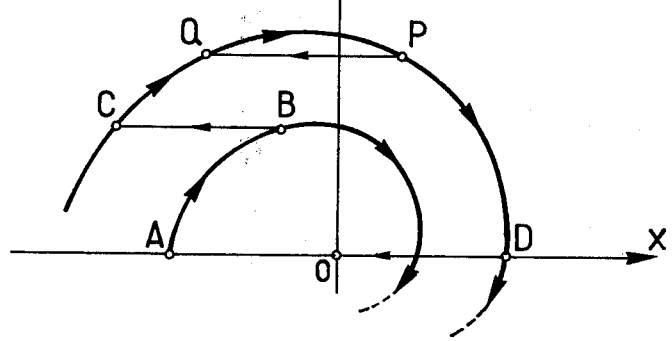
FIG. 3 is a chart which enables the time intervals between the pulses to be determined.

FIG. 3 is a chart which facilitates the choice of these intervals and, in particular, makes it easy to ensure compatibility between two requirements, namely low speed and position near to the required final position. This compatibility imposes a relationship between intervals other than the last interval.

In FIG. 3, the chart shows the free oscillation movement of a second-order system in the phase plane. The position x of the moving unit is plotted against the x-axis and its speed dx/dt is plotted along the y-axis. Damping is not necessarily linear, but it is assumed that it depends only on x and dx/dt. This ensures that the paths are unique. Experience has shown that in many cases, this assumption can be an entirely satisfactory first approximation. It should be also be observed that to a limited degree, the physical parameters and the time intervals may differ from the idealised assumptions and intervals calculated strictly in accordance with the chart. Indeed, providing the difference from the required final position is slight and the residual speed is low at the moment the last pulse is applied, the corresponding potential and kinetic energy will also be low, thereby enabling sufficient steadying to be applied by a relatively light damping device. It has been found that the mere pressure on the disc of the paper struck by the hammer can suffice to prevent the character from sliding.

Returning to the idealized representation of the chart, the point which represents the oscillatory movement is compelled to move clockwise round a spiral, whose parametric co-ordinates are deduced in a known manner from the physical parameters of the device, (i.e. its damping factor and the period of the damped oscillations). The choice of initial conditions determines which spiral in the family of spirals is the one effectively followed.

By taking the x-axis to represent the algebraic difference between the absolute position of the moving unit and the equilibrium position that would result from the pulses already applied to the unit (taking no account of any future pulses), rather than the absolute position itself, it has been found possible to use a single figure to represent the paths which correspond to the various intervals between a plurality of pulses. On the chart, each pulse gives rise to rapid translation of the representative point in a horizontal direction from right to left. Translation takes place over a distance equal to a unit step which, in practice, is constant and equal to the total movement divided by the number of steps but, theoretically speaking, nothing prevents the steps from being unequal to one another. Such inequality does not go beyond the scope of the invention. All the spiral paths are in the same direction and the total path is constituted by an alternation of spiral segments linked by horizontal straight line segments. The spirals can be graduated in absolute units of time or, more conveniently, in units related to the resonant period; in either case the difference in graduation between the starting point and the end of a spiral segment is representative of the length of the time interval between corresponding pulses.

FIG. 3 shows an example of a graphical construction making use of this representation. The symbolic point representative of the system is initially at the origin 0 of the co-ordinates, and passes through A as soon as the first pulse is generated, the co-ordinates of the point A being $-X$ and 0, where the letter X is the unit step. The symbolic point then moves along the spiral which passes through A (initial spiral) in a clockwise direction. After a time, the symbolic point is at B and the second pulse is applied. The symbolic point then moves rapidly in a translation movement equal to $-X$ and is therefore brought to C. In the figure, the point C is situated on the spiral which passes through the point D whose co-ordinates are $+X$ and 0 (final spiral). This allows the symbolic point to be returned to 0 by applying the third pulse at the instant when the symbolic point is at D. In accordance with the invention, this effectively leads to a shift through three steps which ends in the required position and at zero speed.

If there are more steps than three, one or several extra segments of straight lines must be intercalated, the ends of the segments and the beginnings of the following ones being situated on the same spiral. Therefore, in general, there is an infinite number of solutions to the problem, only the first and the last spirals being defined by the parameters of any given moving unit. In one variant, which is preferable for its simplicity but which is given here by way of a non-limiting example, the final spiral is joined as soon as possible and the intermediate straight lines have both of their ends located thereon as does PQ in FIG. 3. This has the advantage of making it possible for a positioning device in accordance with the invention to require a maximum of only four different values for the intervals between pulses to cope with any pulse train of four or more pulses (if a three-pulse train is used there is a need for a special case interval corresponding to the spiral path CD).

The material arrangement of the chart is deduced immediately from FIG. 3. The initial spiral and the final spiral which correspond to estimated or measured damping of the moving unit are traced on a sheet. In the most frequent case, where the unit step is constant, it is chosen as the unit of length. This sets the points A and D at $-1$ and $+1$ on the x-axis. The spirals are graduated in time units related to the period with any origin as required. Other spirals of the family can optionally be drawn if the problem justifies the use of more than four different interval values, e.g. to reduce to a minimum the total time or to evaluate the effect on the final result of an error in the physical magnitudes or of rounding off the durations of the time intervals. Further, a transparent paper sheet will bear the segment of a horizontal straight line of unit length or segments of varying lengths if the step is not constant. The transparent paper, maintained horizontal on the sheet, will be moved thereon until its position is identical to that in FIG. 3 and the intervals will be read on the graduations of the spirals.

We claim:

1. A method of shifting a moving unit from a first position to a second position by means of a stepping motor driven by a finite sequence of pulses, said moving unit being liable to oscillate about its equilibrium point, said method comprising choosing the time intervals which separate said pulses as a function of the period and of the damping factor of the oscillation so that the last pulse is applied to the motor at an instant when the oscillation resulting from the set of preceding pulses brings the moving unit substantially to the required final position and reduces its speed substantially to zero, the improvement comprising applying the last pulse but one of the sequence of pulses to the motor at the instant when the point which represents the shift of the moving unit caused by said pulse and as shown in a phase-plane chart at a point centered on the equilibrium point resulting from said pulse is substantially located on the spiral which passes through the zero speed point and through the point of the x-axis equal to the amplitude of the last step.

2. A method of shifting a moving unit according to claim 1, further comprising applying the pulses other than the last and the first at instants when the point which represents the shift of the moving unit, said shift being caused by each pulse and shown in the chart on the equilibrium point resulting from said pulse, is substantially located on said spiral.

3. A method of shifting a moving unit according to claim 1, further comprising applying the pulses such that the steps between pulses are of identical amplitude.

4. A disc-type printer comprising a rotatable disc bearing a set of characters, a stepping motor for driving said rotating disc to place the required character in the required printing position, said disc being liable to oscillate about its equilibrium position; means for positioning a paper in juxtaposition to said rotating disc and for causing it to advance; means for pressing the paper against the disc when said disc is substantially motionless; means for applying pulses to said motor, the time intervals which separate said pulses being chosen as a function of the period and of the damping factor of the oscillation so that the last pulse is applied to the motor at an instant when the oscillation resulting from the set of preceding pulses brings the moving unit substantially to the required final position and reduces its speed substantially to zero; and means for triggering pulses at defined intervals; wherein the last pulse but one is applied to the motor in such a manner that the point on a phase-plane chart representative of the motion of the moving parts after said last pulse but one, and with respect to the equilibrium position of the parts at that moment is situated on a spiral which passes through the zero speed point on the x-axis at a displacement corresponding to the last pulse and wherein the last pulse is applied to the motor substantially at the moment when the moving parts are in the desired final position.

5. A disc-type printer according to claim 4, wherein said means for triggering pulses at defined intervals further comprises means for applying said pulses other than the last and first at instants when the point which represents the shift of the moving unit, said shift being caused by each pulse and shown in the chart on the equilibrium point resulting from said pulse, is substantially located on said spiral.

6. A disc-type printer according to claim 4, wherein said means for triggering pulses at defined intervals further comprises means for applying said pulses such that the steps between pulses are of identical amplitude.

* * * * *